United States Patent
Miki et al.

(10) Patent No.: US 6,822,849 B2
(45) Date of Patent: Nov. 23, 2004

(54) SOLID ELECTROLYTIC CAPACITOR AND MANUFACTURING METHOD OF THE SAME

(75) Inventors: Katsumasa Miki, Osaka (JP); Tatsuo Fujii, Osaka (JP); Yuji Mido, Osaka (JP); Suzushi Kimura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/703,462

(22) Filed: Nov. 10, 2003

(65) Prior Publication Data

US 2004/0130857 A1 Jul. 8, 2004

(30) Foreign Application Priority Data

Nov. 11, 2002 (JP) ........................................ 2002-326495

(51) Int. Cl.[7] .................................................. H01G 9/00
(52) U.S. Cl. ........................ 361/523; 361/525; 361/532; 29/25.03
(58) Field of Search ................................ 361/523, 525, 361/528–530, 532, 535; 29/25.03

(56) References Cited

U.S. PATENT DOCUMENTS 6,466,430 B2 * 10/2002 Mido et al. .................. 361/529
6,510,045 B2 * 1/2003 Mido et al. .................. 361/529
6,741,448 B2 * 5/2004 Mido et al. .................. 361/302

FOREIGN PATENT DOCUMENTS

JP        2001-307955        11/2001

* cited by examiner

Primary Examiner—Anthony Dinkins
(74) Attorney, Agent, or Firm—Wenderoth, Lind & Ponack, L.L.P.

(57) ABSTRACT

A solid electrolytic capacitor includes a bulb-metal sheet of which first face has a porous section. A dielectric film, a solid electrolyte layer, and a current-collecting layer are formed in this order on the porous section. On top of the current-collecting layer, a reinforcing plate is bonded. A second face opposite to the first face of the sheet has a connecting terminal conductive to the current-collecting layer. This connecting terminal is coupled to a through-hole electrode which extends through the bulb-metal sheet for appearing outside the second face. The second face has another connecting terminal conductive to the bulb-metal sheet. This structure makes the capacitor thin, and allows the capacitor to increase its stress-resistance and be excellent in responsiveness to a high frequency as well as in mounting convenience.

24 Claims, 10 Drawing Sheets

SOLID ELECTROLYTIC CAPACITOR AND MANUFACTURING METHOD OF THE SAME

FIELD OF THE INVENTION

The present invention relates to solid electrolytic capacitors to be used in various electronic devices, and it also relates to a method of manufacturing the same capacitor.

BACKGROUND ART

A conventional solid electrolytic capacitor uses a porous sheet of bulb-metal such as aluminum and tantalum as its electrode. To be more specific, a single face in a thickness direction of the porous sheet of bulb-metal or a core section in the middle of the sheet is used as the electrode. A dielectric film is formed on a surface of the porous section of this bulb-metal sheet, and a solid electrolyte layer such as functional polymer is formed on the dielectric film. On this solid electrolyte layer, a current collecting layer is formed, and on top of the current collecting layer, an electrode layer made of metal is formed, so that a capacitor element is constructed. Capacitor elements, each same as the capacitor element are layered, and the electrodes or electrode-layers of the respective capacitor elements are lumped together and coupled to an external terminal. An outer package is prepared for the capacitor elements such that the external terminal comes outside the package. The conventional solid electrolytic capacitor is thus structured.

The conventional solid electrolytic capacitor discussed above allows increasing its capacitance or lowering an equivalent series resistance (ESR); however, it needs to be mounted on a circuit board via the external terminal as a general capacitor needs to be.

Similar to semiconductor components, the solid electrolytic capacitor mounted onto a circuit board incurs large ESR and equivalent series inductance (ESL) in the circuit because of the presence of lengths of the terminals and the wiring. The responsiveness of such a solid electrolyte capacitor to a high frequency is obliged to lower.

Japanese Patent Application Non-Examined Publication No. 2001-307955 discloses a thin solid electrolytic capacitor which is expected to overcome the foregoing problem. This capacitor has an anode and a cathode alternately arranged on its single face so that components such as semiconductor devices can be mounted thereon directly for reducing the ESR and ESL.

However, the direct mounting of semiconductor components and the like on the capacitor applies stress onto the terminals, so that the capacitor needs strength strong enough to this stress. In the case of placing the capacitor just beneath the semiconductor components, the capacitor needs to operate in an atmosphere where a temperature is higher than the conventional one.

SUMMARY OF THE INVENTION

A solid electrolytic capacitor of the present invention includes the following elements:
  a bulb-metal sheet having a porous section formed at least on its first face;
  a dielectric film formed on this porous section;
  a solid electrolyte layer formed on the dielectric film;
  a current collecting layer formed on the solid electrolyte layer;
  a through-hole electrode conductive to the current collecting layer and extending through the bulb-metal sheet outside a second face opposite to the first face,
  an insulating film that isolates the through-hole electrode from the bulb-metal sheet;
  a first connecting terminal provided on the second face and coupled to the through-hole electrode;
  a second connecting terminal provided on the second face and insulated from the through-hole electrode and conductive to the bulb-metal sheet; and
  a reinforcing plate bonded to the current collecting layer.

A method of manufacturing the solid electrolytic capacitors discussed above includes the steps of:
  (a) forming a porous section on a first face of a bulb-metal sheet;
  (b) forming a dielectric film, a solid electrolyte layer, and a current collecting layer on the porous section;
  (c) providing the bulb-metal sheet with a through-hole;
  (d) forming an insulating film on an inner wall of the through-hole and a second face opposite to the first face of the bulb-metal sheet; then
  (e) forming a through-hole electrode in the through hole for being coupled to the current collecting layer;
  (f) forming a cathodic electrode layer on the current collecting layer for being conductive to the through-hole electrode;
  (g) forming an opening at a given place on the insulating film;
  (h) forming connecting terminals on the opening and the through-hole electrode respectively; and
  (i) bonding the cathode layer to the reinforcing plate.

DETAILED DESCRIPTION OF PREFERRED EMBODIMENTS

Exemplary embodiments of the present invention are demonstrated hereinafter with reference to the accompanying drawings. Similar elements to each other have the same reference marks and the detailed descriptions thereof are omitted.

Exemplary Embodiment 1

Figure 1:
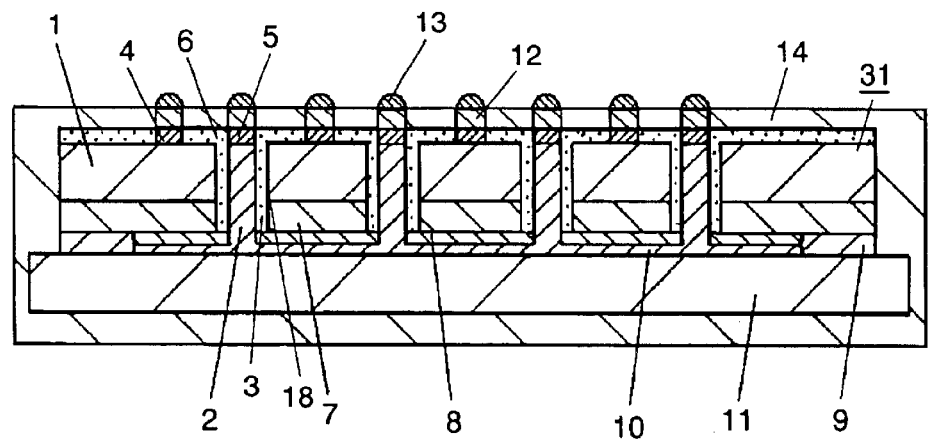
FIG. 1 shows a sectional view of a solid electrolytic capacitor in accordance with a first exemplary embodiment of the present invention.
Figure 2:
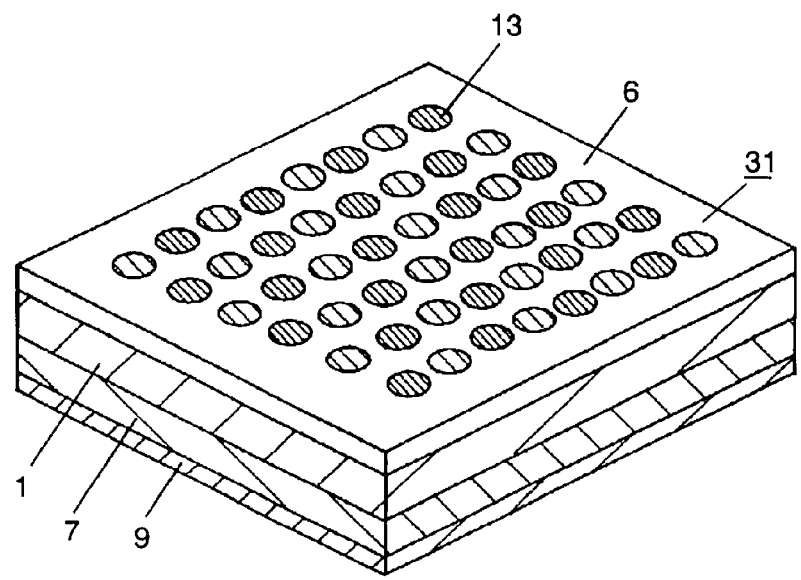
FIG. 2 shows a perspective view of a capacitor element in the solid electrolytic capacitor in accordance with the first exemplary embodiment.
Figure 3:
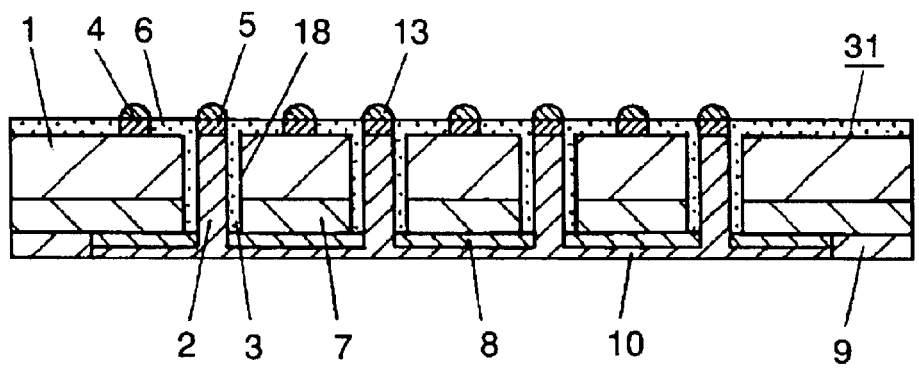
FIG. 3 shows a sectional view of the capacitor element shown in FIG. 2.

FIG. 1 shows a sectional view of a solid electrolytic capacitor in accordance with the first exemplary embodiment of the present invention. As shown in FIG. 1, outer package 14 covers capacitor element 31 of which structure and shape are shown in FIG. 2 and FIG. 3. FIG. 2 shows a perspective view of capacitor element 31 in which connecting bumps 13, i.e., anodes and cathodes, are disposed on a second face opposite to a first face of bulb-metal sheet 1 (hereinafter simply referred to as "sheet"). FIG. 3 shows a sectional view of what is shown in FIG. 2.

Sheet 1 is made from aluminum, and its first face has porous section 7, and through-hole electrodes 2 are provided such that they extend through both of sheet 1 and porous section 7. The perimeter of the first face of sheet 1 employs separator 9 made of insulating material for isolating the anodes from the cathodes. Separator 9 positively prevents a short between current collecting layer 8, cathode layer (electrode layer) 10, and sheet 1 that works as the anode. Use of aluminum as sheet 1 allows this capacitor to have a large capacitance and to be excellent in anti-stress characteristics.

Figure 4:
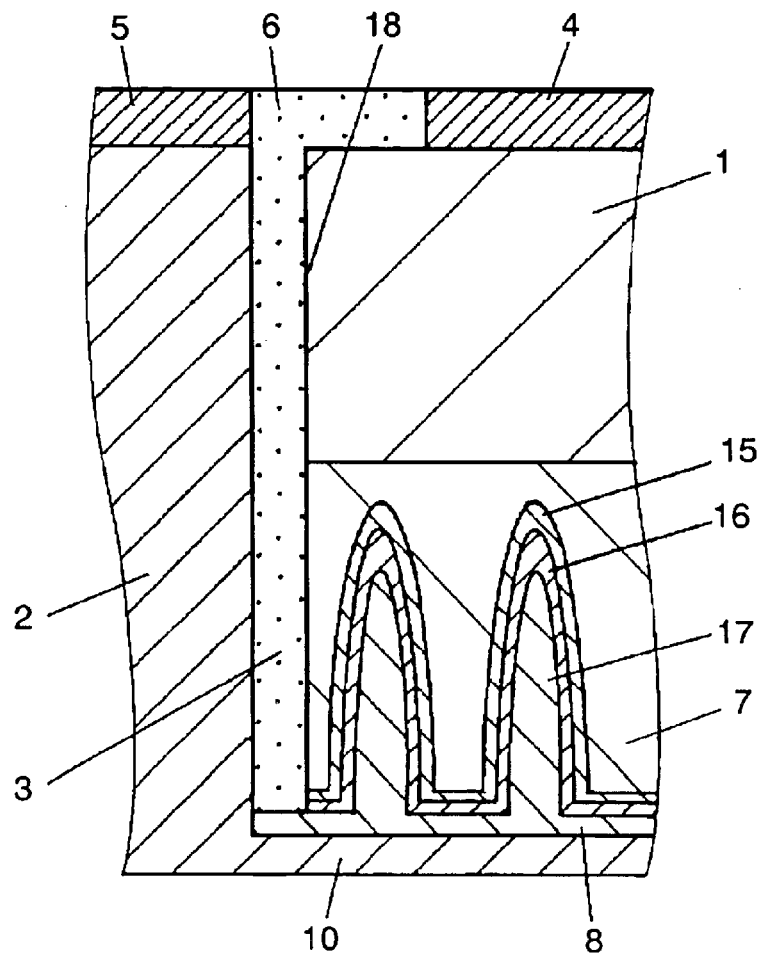
FIG. 4 shows a partial enlarged view of FIG. 3.

FIG. 4 shows an enlarged sectional view around through-hole electrode 2. On porous section 7, dielectric film (hereinafter simply referred to as "film") 15 is formed. Film 15 is made of aluminum oxide formed by anodizing porous section 7 of sheet 1 or is a thin organic film so as to cover sheet 1.

Next, solid electrolyte layer 16 made of polypyrrole or polythiophene or the like is formed on film 15, and carbon layer 17 is formed thereon. Carbon layer 17 works as current-collecting layer 8. On top of layer 8, electrode layer 10 made of conductive adhesive such as silver-paste or copper paste is provided. Layer 10 is coupled to through-hole electrodes 2. Sheet 1 and electrode layer 10 work as the anode and the cathode respectively, so that a capacitance element of the solid electrolytic capacitor is constructed.

The inner wall of through-hole 18 is covered with insulating film 3, and through-hole electrode 2 extending through sheet 1 is unitarily formed with electrode layer 10. Electrode 2 is isolated from sheet 1 by insulating film 3. Insulating section 6 is unitarily formed with insulating film 3 and covers the other area than connecting terminals 4, 5 (hereinafter simply referred to "terminal") prepared on the second face of sheet 1.

Meanwhile, terminal 4 is prepared at a given place of insulating section 6, and terminal 5 is prepared on through-hole electrode 2, and terminals 4 and 5 are arranged alternately. This alternate placement of terminals 4 and 5 substantially reduces ESL (equivalent series inductance) at a high frequency.

On top of terminals 4 and 5, connecting bumps (hereinafter simply referred to as "bump") 13 made from gold or solder are formed. The presence of bumps 13 allows connecting semi-conductor components directly to the capacitor, so that a module component having a low ESL is obtainable.

Capacitor element 31 thus structured is bonded to reinforcing plate 11 via electrode layer 10. Use of conductive adhesive in electrode layer 10 allows forming layer 10 and through-hole electrodes 2 simultaneously, and layer 10 is bonded to board 11 also simultaneously. Silver paste or copper paste including adhesive is suitable for this conductive adhesive from the viewpoint of resistance value. Use of this conductive adhesive achieves both of strong bonding force and low ESR (equivalent series resistance) characteristics.

Reinforcing plate 11 is made of low resistance conductor such as silver, copper or alloy of those metals, and electrically conductive to electrode layer 10 and through-hole electrodes 2 with low resistance. Use of such material to plate 11 allows lowering thermal stress.

Use of reinforcing plate 11, of which at least bonded surface is roughened by sandblast or the like, can strengthen the bonding strength, and thus the reliability of the capacitor increases. In particular, when sliver is used in reinforcing plate 11, its thermal expansion coefficient becomes rather close to that of sheet 1 made of aluminum, so that plate 11 incurs fewer warps after being bonded by thermally hardening the silver paste.

Further, roughening both the surfaces of plate 11 increases adhesion to outer package 14 made of resin, so that moisture is hard to flow into package 14 through the interface.

From the viewpoint of reliability and handling, outer package 14 is provided to the entire capacitor except terminal 4, 5; however, as shown in FIG. 1, intermediate electrodes 12 can be disposed on terminals 4 and 5. This structure allows the entire unit to work as a solid electrolytic capacitor, however, bumps 13 are preferably prepared on intermediate electrodes 12 for shortening the connecting distance to the semiconductor components. In this embodiment, package 14 covers capacitor element 31 and reinforcing plate 11, namely, the area except terminals 4 and 5. This is preferable to increase the reliability of the capacitor, and yet, package 14 can only cover at least sheet 1 except terminals 4, 5, whereby the major part of capacitor element 31 can be sealed.

The structure discussed above allows the thin capacitor to increase its anti-stress characteristics, so that capacitor element 31 is protected against external stress for improving the reliability. The presence of bumps 13 facilitates coupling with semiconductor components, and shortening the wiring for reducing substantially the impedance.

Figure 5:
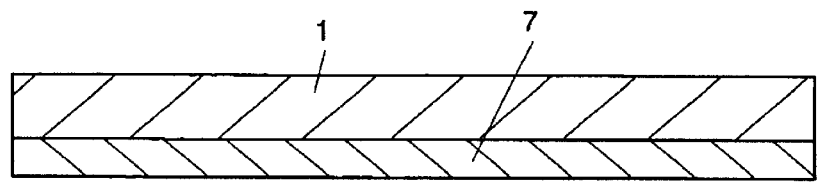
FIG. 5 through FIG. 17 show sectional views illustrating a method of manufacturing the solid electrolytic capacitor in accordance with the first exemplary embodiment.
Figure 6:
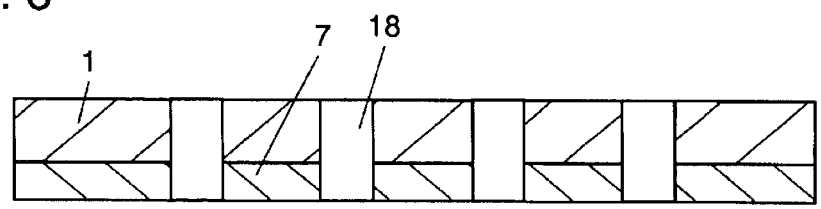

A method of manufacturing the solid electrolytic capacitor is demonstrated hereinafter with reference to FIG. 5 through FIG. 17. FIG. 5 through FIG. 12 illustrate the process of forming capacitor element 31. FIG. 5 shows sheet 1 of which its first face has porous section 7. Sheet 1 is made of aluminum foil of which first face has undergone acid treatment. Then as shown in FIG. 6, through-holes 18 are prepared by laser machining or punching at given places of sheet 1.

Figure 7:
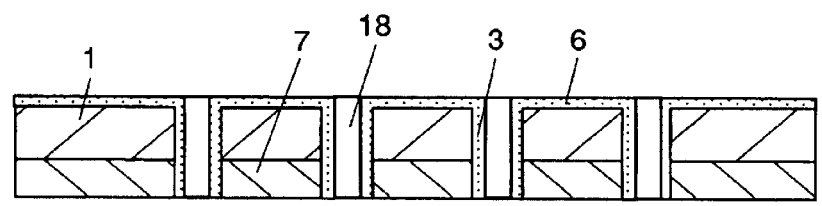

After that, as shown in FIG. 7, insulating film 3 is formed on the inner wall of through-holes 18, and insulating section 6 is formed on a second face opposite to the first face of sheet 1. It is preferable to form film 3 and section 6 unitarily from the viewpoint of insulation reliability. For instance, first, cover porous section 7 with resist material, then form an insulating resin layer by the electro-deposition method, and dip the resist material into solvent for removing. Finally, thermally harden the insulating resin layer. This method is most preferable from the viewpoint of productivity and reliability.

Figure 8:
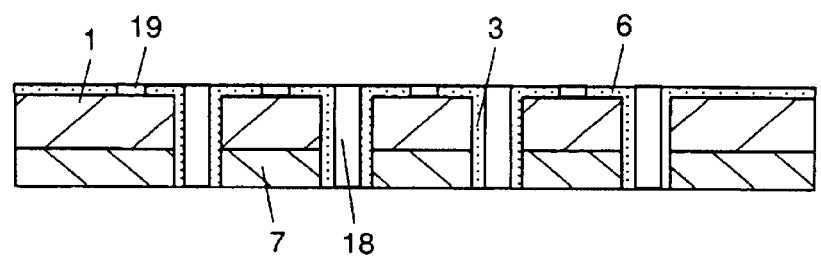
Figure 9:
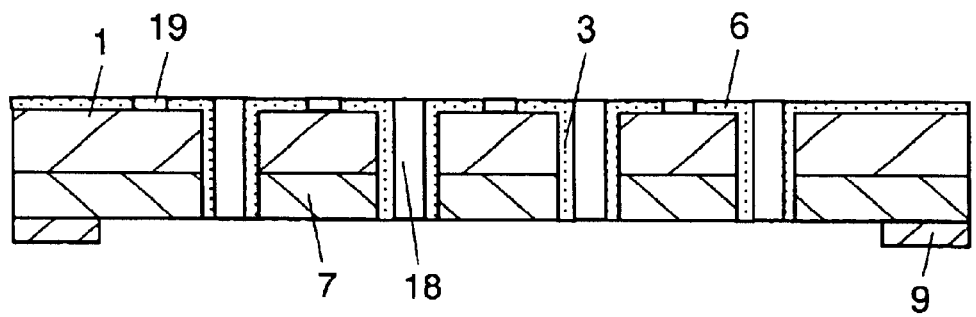

Next, as shown in FIG. 8, remove insulating section 6 by the laser machining or the etching method at given spots to form openings 19. Then as shown in FIG. 9, insulating resin is cured after applying or printing onto the perimeter of the surface of porous section 7, thereby forming separator 9 for isolating the anodes from the cathodes.

Figure 10:
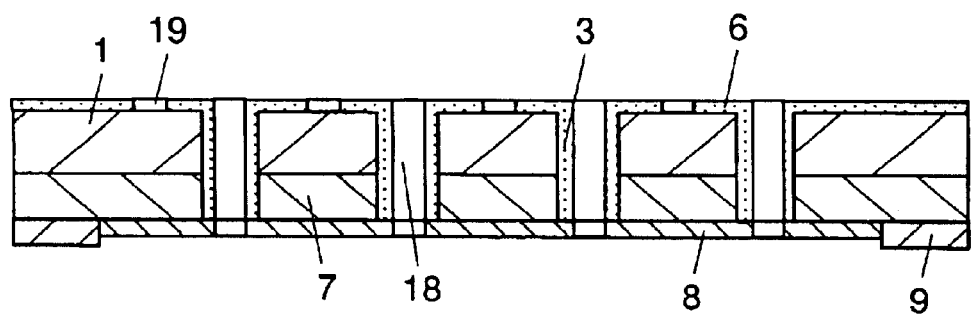

Next, as shown in FIG. 10, form solid electrolyte layer 16 (not shown) and current-collecting layer 8 on porous section 7. First, form a conductive polymer film such as polypyrrole or polythiophene so that solid electrolyte layer 16 is formed. On top of layer 16, apply carbon-paste thereby forming current collecting layer 8.

Figure 11:
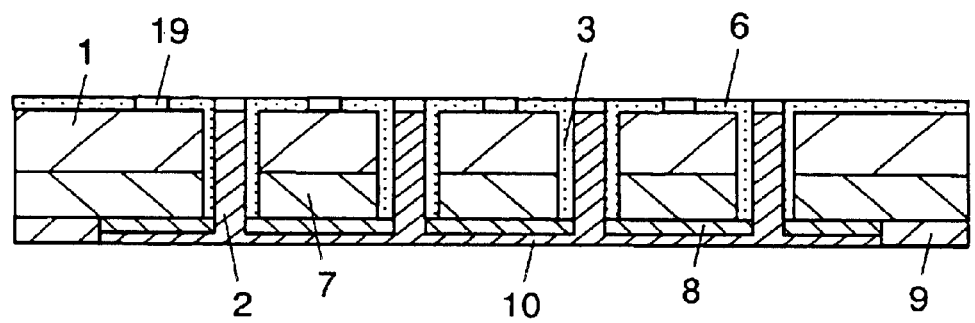

Then as shown in FIG. 11, apply or print silver paste on current collecting layer 8, and at the same time, fill through-holes 18 with the silver paste and cure the paste, so that electrode layer 10 and through-hole electrodes 2 are formed. At this time, the silver paste is squeegeed with a uniform pressure, so that through-holes 18 are filled with the silver paste up to a uniform height.

Figure 12:
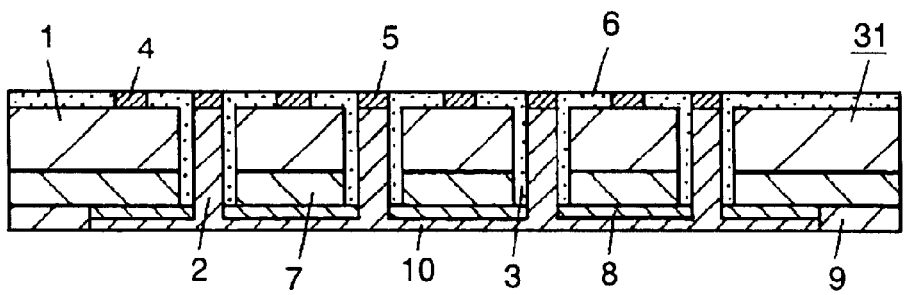

Next, as shown in FIG. 12, terminals 4 and 5 made from copper or gold by plating with respect to the surface of sheet 1 exposed from opening 19 and an exposed section of silver paste of through-hole electrodes 2. Capacitor element 31 is thus completed.

FIG. 13 through FIG. 17 illustrate an instance of how to package capacitor element 31 into a reliable solid electrolytic capacitor of easy-handling.

Figure 13:
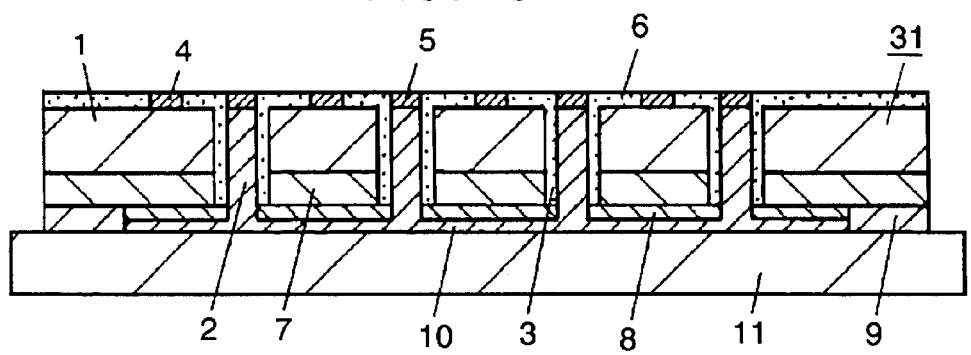

First, as shown in FIG. 13, bond reinforcing plate 11 to capacitor element 31 with conductive adhesive such as silver paste. This bonding prevents the capacitor from being deformed and maintains the flatness of the capacitor, and at the same time, allows the capacitor to be reliable against external stress.

Figure 14:
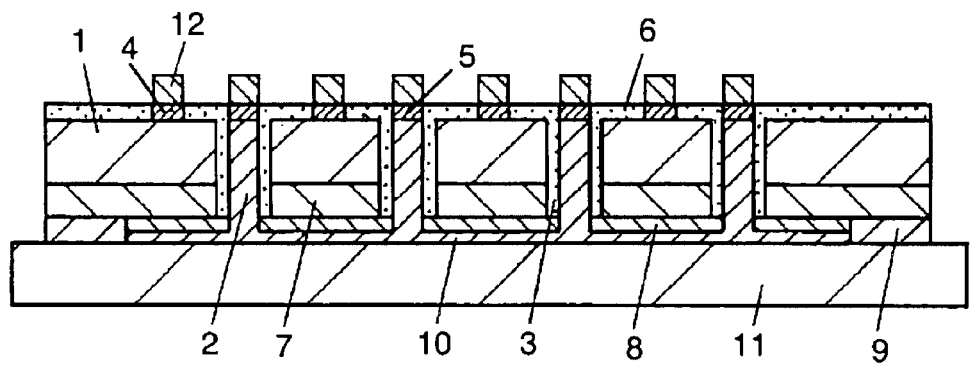

Next, as shown in FIG. 14, form intermediate electrodes 12 on terminals 4, 5. Intermediate electrode 12 is formed by heating a solder ball placed each one of terminals 4 and 5, or formed by applying solder paste by printing, then melting the paste. Electrode 12 can be formed also by disposing bumps made from gold (Au) by the wire-bonding method. Those methods can form intermediate electrode 12 of low ESR with ease.

Figure 15:
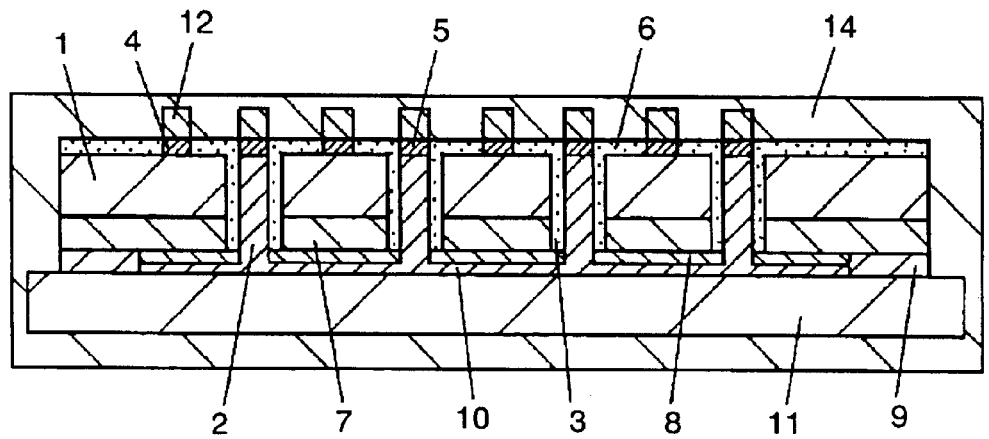
Figure 16:
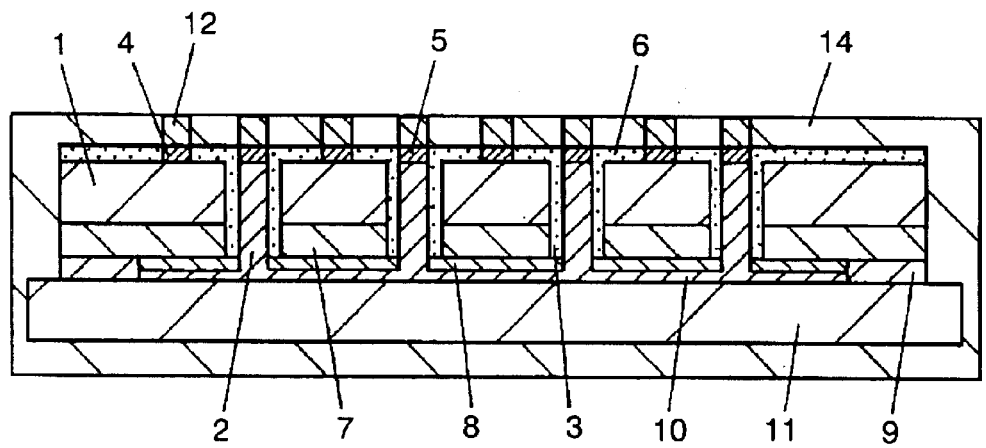

Then hold the capacitor having electrodes 12 with some jig, and cover the capacitor completely with liquid resin. After that, heat and cure the liquid resin to form outer package 14, so that the structure shown in FIG. 15 is obtained. Instead of heating and curing the liquid resin, the transfer-mold method is used for molding the resin into outer package 14. Next, as shown in FIG. 16, polish a face of package 14 at the side of the second face of sheet 1 to make the face flat, so that parts of intermediate electrodes 12 are exposed. As a result, the solid electrolytic capacitor, in which intermediate electrodes 12 are accurately placed on its flat face, is obtainable.

Figure 17:
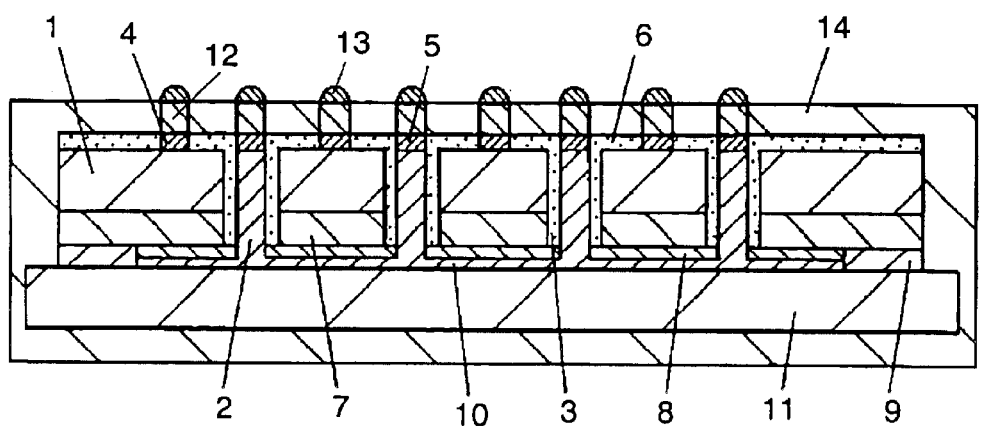

When a semiconductor component is directly connected to this capacitor, bumps 13 made of gold or solder can be formed on electrode 12, as shown in FIG. 17.

Through the manufacturing method discussed above, electrode-terminals arranged on the flat face can be formed efficiently, and a solid electrolytic capacitor of highly flatness is obtainable. This capacitor can be thus coupled with ease to connecting terminals of semiconductor components or the like, and is excellent in responsiveness to a high frequency and in reliability against external stress.

Exemplary Embodiment 2

FIG. 18 through FIG. 23 show sectional views illustrating a method of manufacturing the solid electrolytic capacitor in accordance with the second exemplary embodiment.

Figure 18:
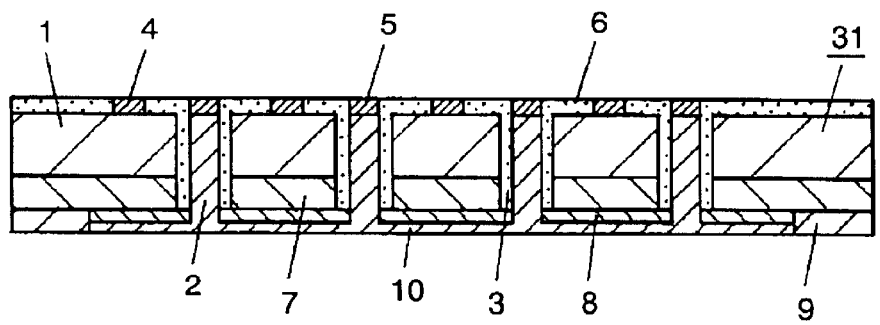
FIG. 18 through FIG. 23 show sectional views illustrating a method of manufacturing the solid electrolytic capacitor in accordance with a second exemplary embodiment.
Figure 19:
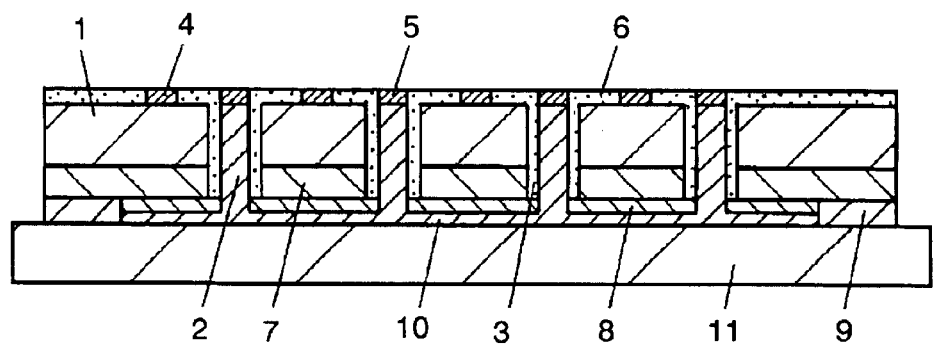

FIG. 18 shows capacitor element 31 formed by the same method as the first embodiment. Then as shown in FIG. 19, bond conductive reinforcing plate 11 to element 31 with conductive adhesive employed on a first face of bulb-metal sheet 1. This step is similar to that demonstrated in FIG. 13 of the first embodiment.

Figure 20:
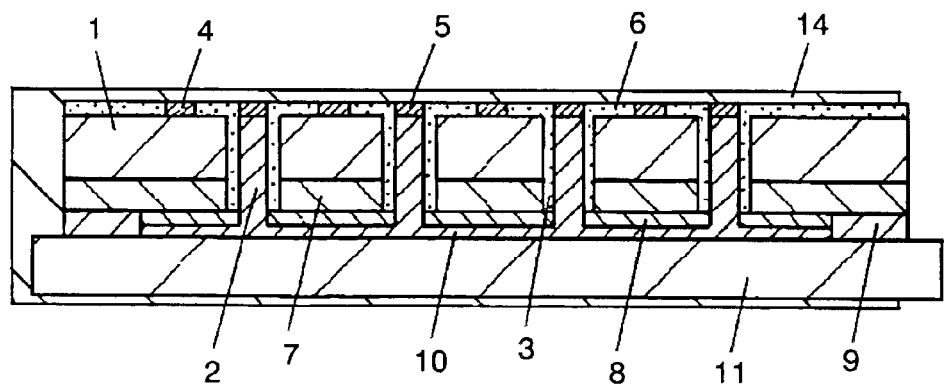
Figure 21:
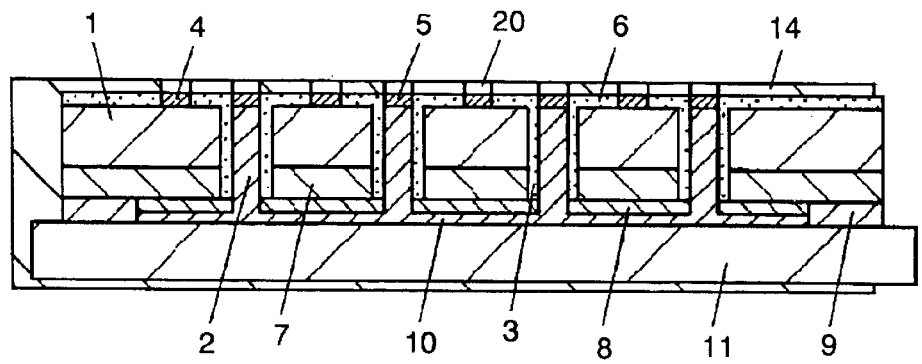

Next, as shown in FIG. 20, a part of bulb-metal sheet 1 and a part of reinforcing plate 11 are exposed, and the remaining parts are covered with outer package 14. Then as shown in FIG. 21, package 14 is removed at only spots just above connecting terminals 4 and 5 by the laser machining or the etching method, so that openings 20 are prepared, and terminals 4 and 5 are exposed.

Figure 22:
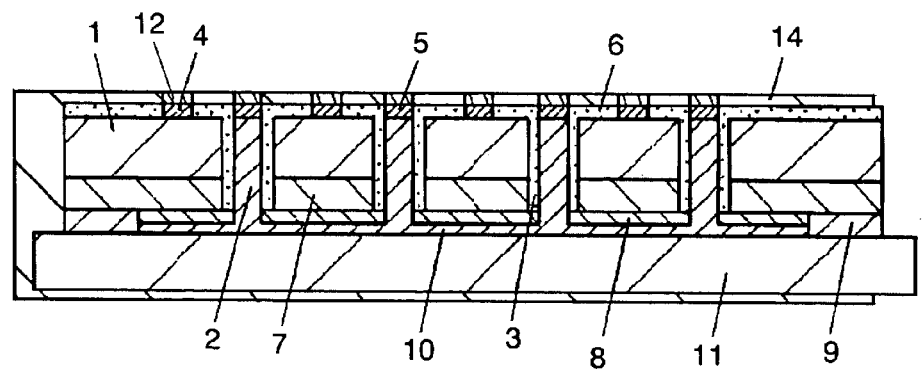

Then as shown in FIG. 22, feed the electric power to the exposed sections of sheet 1 and plate 11, while capacitor element 31 is dipped in electro-plating chemicals, and form intermediate electrodes 12 in openings 20 by electro-plating such that electrodes 12 are conductive to terminals 4 and 5. Electrodes 12 of low resistance can be thus formed with accuracy. This manufacturing method is excellent in productivity.

Figure 23:
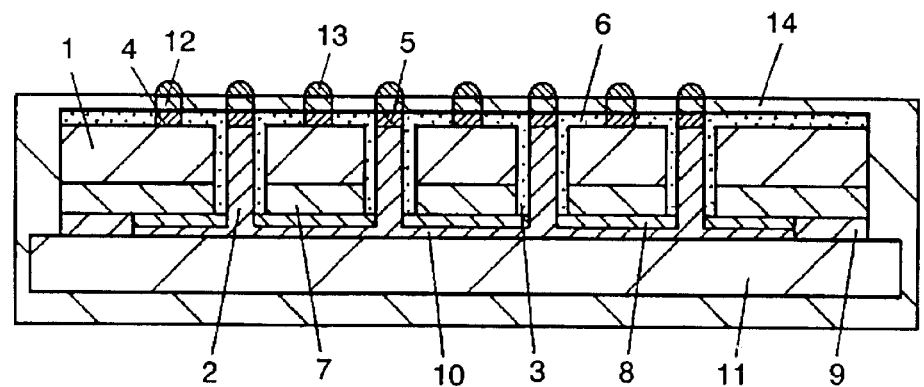

After that, as shown in FIG. 23, cover the exposed sections of sheet 1 and plate 11 with insulating resin, so that package 14 is completed. When a semiconductor component is directly mounted on the capacitor, connecting bumps 13 can be formed on intermediate electrodes 12 in the same way as the first embodiment.

The method discussed above can save the step of polishing package 14 as done in the first embodiment, so that a solid electrolytic capacitor having the electrodes of high evenness can be obtained efficiently. Since no stress is applied to the capacitor, the reliability of the capacitor improves. The exposed sections of sheet 1 and plate 11 can be used as feeding-power sections for electro-plating, so that a speed of plating becomes faster. As a result, intermediate electrodes 12 can be formed more efficiently.

Exemplary Embodiment 3

Figure 24:
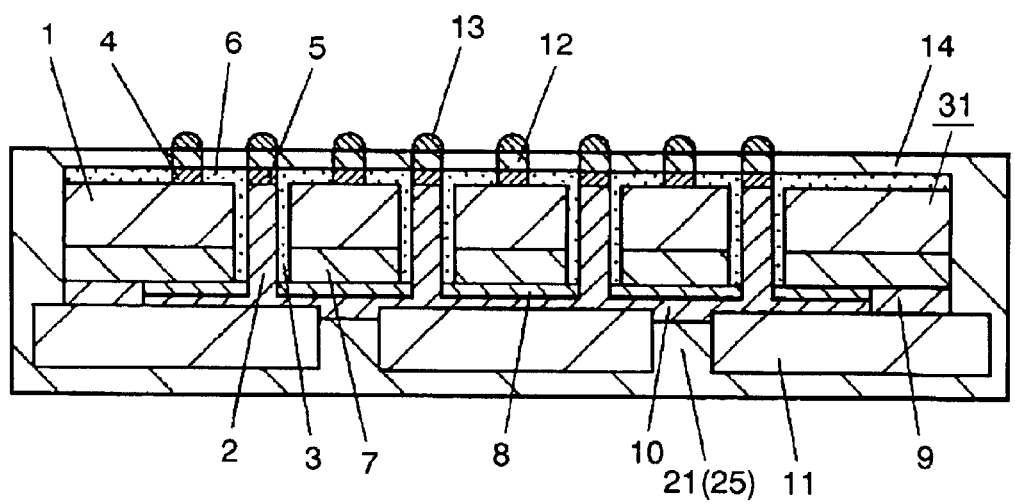
FIG. 24 shows a sectional view of a solid electrolytic capacitor in accordance with a third exemplary embodiment of the present invention.

FIG. 24 shows a sectional view of a solid electrolytic capacitor in accordance with a third exemplary embodiment of the present invention. The third embodiment is similar to the first embodiment and the manufacturing method is also similar to that described in the first embodiment. The third embodiment differs from the first one significantly in providing holes 21 on reinforcing plate 11. Holes 21 are filled with parts of conductive adhesive used for bonding plate 11 to capacitor element 31, so that parts of the cathode are filled into holes 21, and parts of package 14 are also filled into holes 21.

The presence of holes 21 on plate 11 allows an excess of conductive-adhesive to flow into holes 21, so that adhesion between capacitor element 31 and plate 11, and adhesion between package 14 and plate 11 are improved. Because a thickness of electrode layer 10 existing between element 31 and plate 11 becomes as thin as possible. This structure makes the overall capacitor flat. Further, reduction of peaks and valleys on the second face of sheet 1 will increase the flatness of terminals 4, 5, intermediate electrodes 12, and bumps 13 when bonding element 31 to plate 11. On top of those advantages, an adhering face-area between the conductive adhesion and plate 11, and that between package 14 and plate 11 are increased, so that the bonding strength becomes greater. As a result, the reliability of the solid electrolytic capacitor increases.

In this embodiment, holes 21 are provided to reinforcing plate 11; however grooves 25 instead of holes 21 can produce a similar advantage to what is discussed above. Preparation of both of holes and grooves will produce also a similar advantage.

A method of manufacturing the solid electrolytic capacitor in accordance with the present embodiment is basically the same as that described in the first embodiment. In this embodiment, after providing holes 21 to reinforcing plate 11, capacitor element 31 is bonded to plate 11 with the conductive adhesive as done in the first embodiment. If grooves 25 are employed instead of holes 21, element 31 is bonded to the face of plate 11 having the grooves, so that the solid electrolytic capacitor having the same advantages as the one employing holes 21 is obtainable.

Exemplary Embodiment 4

Figure 25:
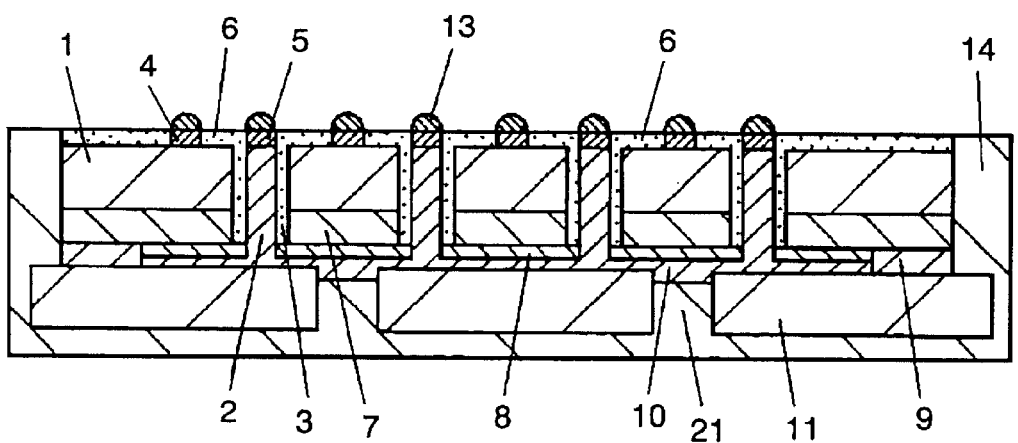
FIG. 25 shows a sectional view of a solid electrolytic capacitor in accordance with a fourth exemplary embodiment of the present invention.

FIG. 25 shows a sectional view of a solid electrolytic capacitor in accordance with a fourth exemplary embodiment of the present invention. The fourth embodiment shows basically a similar structure to that demonstrated in the third embodiment, but differs from the third embodiment in the following point: outer package 14 is not formed on the second face of bulb-metal sheet 1 in the fourth embodiment.

In the solid electrolytic capacitor shown in FIG. 25, insulating section 6 works as outer package 14 on the second face of sheet 1. This structure eliminates intermediate electrodes 12, so that the overall height becomes lower, which results in the smaller impedance of the capacitor. A height between connecting terminals 4, 5 and connecting bumps 13 can be reduced because of no intermediate electrodes 12 as well as the width of terminals 4, 5 plus bumps 13 can be reduced with ease. Thus an elaborate shape of electrode can be accurately formed.

In the structure discussed above, insulating section 6 maintains the sealing property of the second face of sheet 1 while outer package 14 assures the overall strength of the capacitor.

In this embodiment, package 14 does not cover the second face of sheet 1; however, it can cover parts of the second face provided a thickness of package 14 is smaller than the height of bump 13. In this case, outer package 14 increases the reliability free from interfering with other components to be mounted to the capacitor.

Exemplary Embodiment 5

Figure 26:
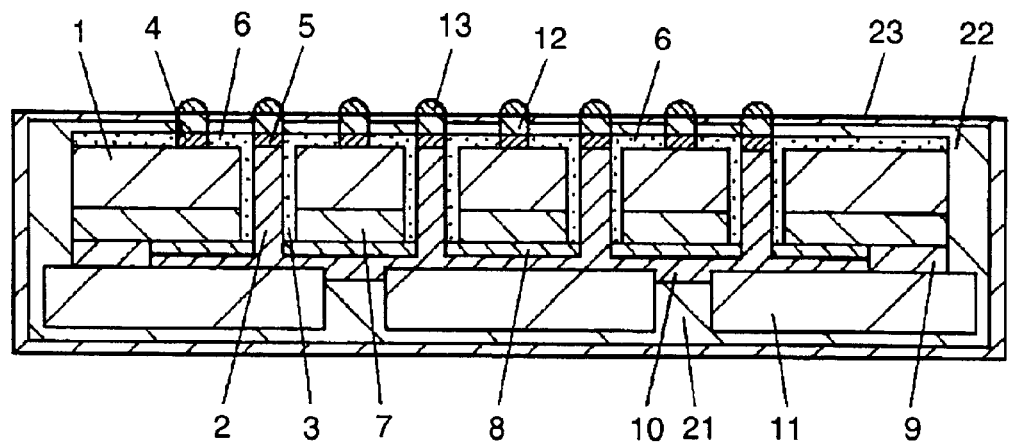
FIG. 26 shows a sectional view of a solid electrolytic capacitor in accordance with a fifth exemplary embodiment of the present invention.

FIG. 26 shows a sectional view of a solid electrolytic capacitor in accordance with a fifth exemplary embodiment of the present invention. The fifth embodiment is basically similar to the third one, but differs from the third one significantly in the following point: Outer package 14 is formed of two layers, i.e., inside package 22 and outside package 23. For instance, package 22 is formed of the material of rather higher hardness, and package 23 is formed of the material of which hardness is lower than that of package 22. This structure allows inside package 22 to maintain the shape of the capacitor and outside package 23 to absorb an external shock or stress. As a result, the solid electrolytic capacitor more excellent in anti-stress characteristics is obtainable.

On the contrary, inside package 22 is formed of rather soft material, and outside package 23 is formed of the harder material. This structure allows outer package 14 to be flexible as well as excellent in abrasive resistance. As such, outer package 14 can be formed of plural layers differing in material from each other, so that package 14 can have various properties such as hardness and flexibility in its thin body.

Inside package 22 and outside package 23 can be employed in the first embodiment or the second embodiment.

Exemplary Embodiment 6

Figure 27:
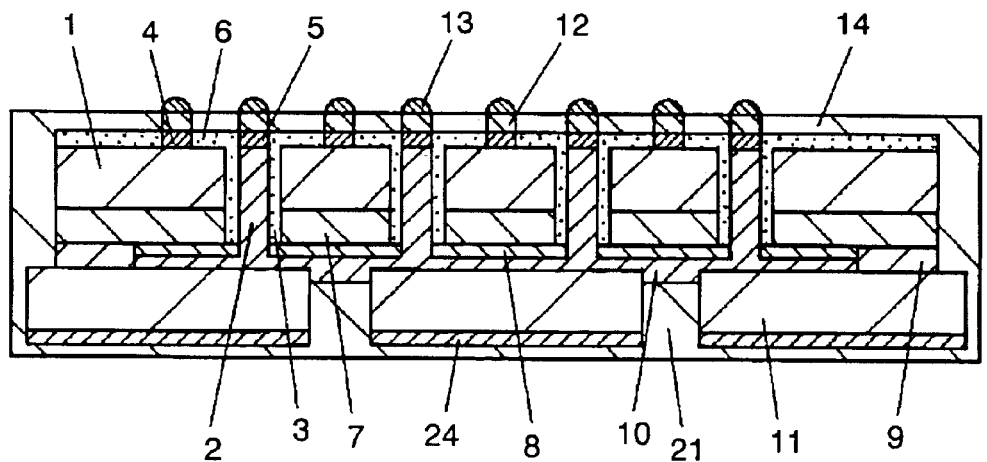
FIG. 27 shows a sectional view of a solid electrolytic capacitor in accordance with a sixth exemplary embodiment of the present invention.

FIG. 27 shows a sectional view of a solid electrolytic capacitor in accordance with a sixth exemplary embodiment of the present invention. The sixth embodiment is basically similar to the third one, but differs from the third one in the following point: Buffer material 24 is provided to a single face of reinforcing plate 11. Buffer material 24 is formed on the opposite face to the face bonded to capacitor element 31.

Buffer material 24 is preferably made of the material of which thermal expansion coefficient is equal to that of bulb-metal sheet 1 or intermediate between those of sheet 1 and plate 11.

This structure allows reducing a warp of plate 11 when element 31 and plate 11 are heated and bonded together using the conductive adhesive. This structure also reduces a warp of the capacitor caused by a change of ambient temperature. The solid electrolytic capacitor of the present invention is to be mounted directly with semiconductor components, so that the capacitor is subject to the heat generated from the semiconductor components. However, the structure according to this embodiment reduces the influence of the heat.

Further, since the warp after the bonding is reduced, terminals 4 and 5 can increase their flatness, so that intermediate electrodes 12 and connecting bumps 13 can be formed with ease, and an accuracy of mounting other components onto the capacitor increases.

In the case of sheet 1 having a greater thermal expansion coefficient than that of reinforcing plate 11, buffer material 24 employs the material having stress contracting in the face direction (horizontal direction in FIG. 27). In the reversal case, buffer material 24 employs the material having stress extending in the face direction. As a result, the warp after the heating and bonding can be reduced.

Buffer material 24 having the foregoing characteristics can be easily formed by a film-deposition method such as plating, vapor-deposing, and spattering. For instance, in the case of forming a chrome film by spattering, thin films having a variety of stresses are obtainable by changing a spattering rate, a degree of vacuum, and a temperature at forming the film. Buffer material 24 as discussed above can prevent the solid electrolytic capacitor from being deformed by heat with almost no increase in the thickness of reinforcing plate 11. Buffer material 24 can be used in the first embodiment or the second embodiment.

The present invention can increase the stress resistance and environment resistance of the thin solid electrolytic capacitor having low impedance. The capacitor, to which semiconductor components can be mounted with ease, is thus obtainable.

What is claimed is:

1. A solid electrolytic capacitor comprising:
    (a) a bulb-metal sheet of which at least a first face has a porous section;
    (b) a dielectric film formed on the porous section;
    (c) a solid electrolyte layer formed on the dielectric film;
    (d) a current collecting layer formed on the solid electrolyte layer;
    (e) a through-hole electrode conductive to the current collecting layer and extending through the bulb-metal sheet for appearing on a second face opposite to the first face of the bulb-metal sheet;
    (f) an insulating film for insulating the through-hole electrode from the bulb-metal sheet;
    (g) a first connecting terminal disposed on the second face and conductive to the through-hole electrode;
    (h) a second connecting terminal disposed on the second face and insulated from the through-hole electrode, and yet conductive to the bulb-metal sheet; and
    (i) a reinforcing plate bonded on the current-collecting layer.

2. The solid electrolytic capacitor of claim 1 further comprising:
    (j) an outer package for covering the bulb-metal sheet except at least the first and second connecting terminals.

3. The solid electrolytic capacitor of claim 2, wherein the outer package comprises a plurality of layers having hardness different from each other.

4. The solid electrolytic capacitor of claim 2, wherein the outer package further covers the dielectric film, the solid electrolyte layer, the current-collecting layer, the through-hole electrode and the reinforcing plate.

5. The solid electrolytic capacitor of claim 1 further comprising:
(j) a plurality of intermediate electrodes coupled to one of the first and the second connecting terminals; and
(k) an outer package for covering the second face of the bulb-metal sheet except the plurality of intermediate electrodes.

6. The solid electrolytic capacitor of claim 1 further comprising:
(j) a separator, disposed at a perimeter of the porous section of the bulb-metal sheet, for isolating an anode from a cathode of the capacitor.

7. The solid electrolytic capacitor of claim 1 further comprising:
(j) a connecting bump coupled to one of the first and the second connecting terminals.

8. The solid electrolytic capacitor of claim 1, wherein the bulb-metal sheet comprises aluminum.

9. The solid electrolytic capacitor of claim 1, wherein the reinforcing plate includes at least one of silver and copper.

10. The solid electrolytic capacitor of claim 1 further comprising:
(j) conductive adhesive for bonding the first face of the sheet to the reinforcing plate.

11. The solid electrolytic capacitor of claim 10, wherein the conductive adhesive comprises one of silver paste and copper paste.

12. The solid electrolytic capacitor of claim 1, wherein the reinforcing plate is provided with one of a hole and a groove.

13. The solid electrolytic capacitor of claim 1, wherein the reinforcing plate of which at least one face bonded to the current collecting layer is roughened.

14. The solid electrolytic capacitor of claim 1 further comprising:
(j) a buffer material having an identical thermal expansion coefficient same as that of the bulb-metal sheet and being disposed on an opposite face of the reinforcing plate to a face bonded to the bulb-metal sheet.

15. The solid electrolytic capacitor of claim 1 further comprising:
(j) a buffer material having an intermediate thermal expansion coefficient between those of the bulb-metal sheet and the reinforcing plate, and being disposed on an opposite face of the reinforcing plate to a face bonded to the bulb-metal sheet.

16. The solid electrolytic capacitor of claim 1 further comprising:
(j) a buffer material disposed on an opposite face of the reinforcing plate to a face bonded to the bulb-metal sheet and having stress contracting in a face direction when the bulb-metal sheet has a greater thermal expansion coefficient than that of the reinforcing plate.

17. The solid electrolytic capacitor of claim 1 further comprising:
(j) a buffer material disposed on an opposite face of the reinforcing plate to a face bonded to the bulb-metal sheet and having stress extending in a face direction when the bulb-metal sheet has a smaller thermal expansion coefficient than that of the reinforcing plate.

18. A method of manufacturing a solid electrolytic capacitor which is formed by forming a porous section on a first face of a bulb-metal sheet, next forming a dielectric film on the porous section, and forming a solid electrolyte layer on the dielectric film, then forming a current-collecting layer on the solid electrolyte layer, the method comprising the steps of:
(a) providing the bulb-metal sheet with a through-hole;
(b) forming an insulating film on an inner wall of the through-hole and on a second face opposite to the first face of the bulb-metal sheet;
(c) forming a through-hole electrode, which is coupled to the current collecting layer, in the through-hole, and a cathodic electrode layer, which is conductive to the through-hole electrode, on the current collecting layer;
(d) forming an opening at a predetermined place on the insulating film;
(e) forming connecting terminals on the opening and the through-hole electrode respectively; and
(f) bonding the cathode to the reinforcing plate.

19. The method of manufacturing the solid electrolytic capacitor of claim 18 further comprising the steps of:
(g) forming intermediate electrodes on the connecting terminals;
(h) forming an outer package for covering all faces of the capacitor; and
(i) removing parts of the outer package for exposing the intermediate electrodes.

20. The method of manufacturing the solid electrolytic capacitor of claim 19, wherein the intermediate electrodes are formed by one of plating, wire-bonding, mounting a solder ball, and solder-printing in step (g).

21. The method of manufacturing the solid electrolytic capacitor of claim 18 further comprising the steps of:
(g) forming an outer package with exposing parts of the bulb-metal sheet and the reinforcing plate;
(h) forming intermediate electrodes on the connecting terminals by removing parts of the outer package; and
(i) forming the outer package at a place where parts of the bulb-metal sheet and the reinforcing plate are exposed.

22. The method of manufacturing the solid electrolytic capacitor of claim 21, wherein, electric power is fed to the place where parts of the reinforcing plate and the bulb-metal sheet are exposed to carry out electro-plating for forming the intermediate electrodes in step (h).

23. The method of manufacturing the solid electrolytic capacitor of claim 18 further comprising the steps of:
(g) providing the reinforcing plate with one of a hole and a groove thereon.

24. The method of manufacturing the solid electrolytic capacitor of claim 23 further comprising the steps of:
(h) forming intermediate electrodes on the connecting terminals;
(i) forming an outer package for covering all faces of the capacitor; and
(j) removing parts of the outer package for exposing the intermediate electrodes.

* * * * *